United States Patent [19]
Kim

[11] Patent Number: 5,863,209
[45] Date of Patent: Jan. 26, 1999

[54] EDUCATIONAL IMAGE DISPLAY DEVICE

[75] Inventor: Bong Gyeong Kim, Busan, Rep. of Korea

[73] Assignee: L&K International Patent & Law Office, Seoul, Rep. of Korea

[21] Appl. No.: 852,424

[22] Filed: May 8, 1997

[51] Int. Cl.$^6$ .................................................. G09B 29/00
[52] U.S. Cl. .......................................... 434/428; 348/373
[58] Field of Search .................................. 434/428, 324, 434/365; 396/419; 248/637; 348/42, 207, 163.1, 373

[56] References Cited

U.S. PATENT DOCUMENTS

| | | | |
|---|---|---|---|
| 2,713,609 | 7/1955 | Niklason | 348/373 |
| 3,270,652 | 9/1966 | Mason et al. | 396/419 |
| 3,356,325 | 12/1967 | Schnase | 396/419 |
| 3,699,252 | 10/1972 | Jackson | 178/7.2 |
| 3,891,842 | 6/1975 | Strusinski | 240/1.4 |
| 4,115,813 | 9/1978 | Mikami | 358/229 |
| 4,525,052 | 6/1985 | Kosugi et al. | 396/419 |
| 4,601,565 | 7/1986 | Fisher | 396/419 |
| 4,654,703 | 3/1987 | Viera | 358/108 |
| 4,763,151 | 8/1988 | Klinger | 354/293 |
| 4,800,437 | 1/1989 | Hosoya | 358/244 |
| 4,929,973 | 5/1990 | Nakatani | 354/293 |
| 4,939,580 | 7/1990 | Ishikawa et al. | 358/229 |
| 4,963,986 | 10/1990 | Fukuyama et al. | 358/228 |
| 5,119,203 | 6/1992 | Hosaka et al. | 358/229 |
| 5,347,431 | 9/1994 | Blackwell et al. | 362/11 |
| 5,594,502 | 1/1997 | Bito et al. | 348/378 |
| 5,734,417 | 3/1998 | Yamamoto et al. | 348/61 |
| 5,751,355 | 5/1998 | Bito et al. | 348/375 |

OTHER PUBLICATIONS

3M Dataconferencing System DCS 3000, Jul. 1998.
Canon Visual Communications Systems Video Visualizer RE–350 2 year model 650 MK–2 also sited, Jul. 1998.

*Primary Examiner*—Robert A. Hafer
*Assistant Examiner*—David A. Fleming
*Attorney, Agent, or Firm*—Longacre & White

[57] ABSTRACT

An image display device preferably used for educational applications is disclosed. In the image display device, an instructor gives a lecture while seeing an original document without being disturbed by any element of the device. In addition, a video camera, which is detachably attached to the camera mount, may be tilted to the left or right or tilted upward or downward so that it is not required to move the original document when the left, right, upper or lower side of the document has to be picked up by the camera. The above display device also includes a means used as either a whiteboard or an OHP-filmed image revealing panel. The device thus improves educational effect when it is used for educational applications. The device is not expensive thus being widely used for educational applications without forcing excessive costs on the owner.

7 Claims, 6 Drawing Sheets

EDUCATIONAL IMAGE DISPLAY DEVICE

BACKGROUND OF THE INVENTION

1. Field of the Invention

The present invention relates, in general, to an educational image display device used for inputting an image from a video camera to a TV and displaying the image on the TV for educational applications and, more particularly, to a structural improvement in such a device to give recording, close pickup and video microscopic functions to the device, detachably attach a video camera to the camera mount, selectively rotate the camera mount as desired, equip the device with a means used as a whiteboard or a filmed image revealing panel and use an RF (radio frequency) module in the device in order to make the device usable with any TV, including AV TVs and outmoded TVs.

2. Description of the Prior Art

In the prior art, specifically-designed image display devices for educational applications are not known. Therefore, known image display devices, which are designed to be mainly used for conference applications and are individually equipped with a fixed camera, are used for educational applications. However, such known image display devices are problematic in that they are destitute of recording and close pickup functions required for the educational applications. Another problem of the known devices resides in that each of them only picks up and displays a limited area of an original document laid on a stand, thus limiting the quantity of educational information provided by the displayed image. In addition, the location of an instructor, giving a lecture with such a known image display device, is limited to a side of the original document laid on the stand so that the device is inconvenient to the instructor while lecturing. A further problem of such a known display device resides in that a board, on which the instructor writes letters and/or draws figures with chalk or a board marker to expound further upon the lecturing point, has to be prepared in addition to the display device. Yet another problem experienced by the device is that the device is very expensive and thereby makes a user hesitant to buy it.

SUMMARY OF THE INVENTION

It is, therefore, an object of the present invention to provide a specifically-designed educational image display device in which the above problems can be overcome.

Another object of the present invention is to provide an educational image display device which has a camera mount structure suitable for detachably attaching a video camera to the device and freely adjusts the image pickup angle of the camera.

A further object of the present invention is to provide an educational image display device which uses an RF module, connected to the power source of the device in parallel, thus being usable with any TV including outmoded TVs.

Yet another object of the present invention is to provide an educational image display device which allows an instructor to give a lecture, with a document being laid straight on a document stand and without being disturbed by an upright column of the device.

Still a further object of the present invention is to provide an educational image display device which has a means used as either a whiteboard or a filmed image revealing panel.

Another object of the present invention is to provide an educational image display device which is not expensive thus being widely used for educational applications without forcing excessive costs on the owner.

In order to accomplish the above objects, the present invention provides an educational image display device comprising a flat stand laid on a support surface, which includes: a drawer defining a space for receiving and keeping various necessaries therein; a plurality of holders used for holding a pen, a remote controller and a charger therein; a column mounting slot; an arm control switch; a signal input terminal unit receiving an image signal from a video camera; and a signal output terminal unit outputting the image signal to a display means. The device also comprises an upright column, which is fitted in the column mounting slot of the stand thereby erecting it on the stand. The column is hollow thus defining an electric wire passage therein and has a rack gear on one sidewall thereof. A camera holding arm is perpendicularly coupled to the upright column, with a pinion gear gearing into the rack gear of the column, thus being selectively raised or lowered relative to the column when the arm control switch is operated. The camera holding arm includes a hollow straight arm part movably coupled to the column and having a reduction motor; a hollow bent arm part coupled to the straight arm part; and a camera mount part mounting the video camera to the camera holding arm. The device further comprises the display means, which receives the image signal from the signal output terminal unit of the stand and thereby displays an educational image thereon.

The device also includes a bulb switch installed on the flat stand; a light bulb installed in a light box formed on the top of the flat stand and turned on or off in conjunction with the bulb switch; a transparent glass panel set on the top of the light box; and a translucent white coating paper coated on the top of the glass panel, thus allowing the glass panel to be selectively used as an OHP-filmed image revealing panel or a whiteboard.

In the device, the camera mount part comprises: a recessed mount seat formed on the bent arm part by cutting one sidewall of the bent arm part into an X-shaped configuration, the seat having a plurality of setting points; a longitudinal camera mount rotatably attached to the center of the mount seat and adapted for holding the camera, the mount having a spring-biased ball snapped into either of the setting points of the mount seat thus setting an adjusted position of the camera; and a dovetail slide groove longitudinally formed on the camera mount and slidably and detachably attaching the video camera to the camera mount through a dovetail joint.

The camera mount selectively tilts the camera to the left or right.

The bent arm part of the camera holding arm is coupled to the straight arm part, with a position setting means and a plurality of setting points being provided on opposite surfaces of the bent and straight arm parts respectively in the junction between the two arm parts, the position setting means having a spring-biased ball seated into either of the setting points of the straight arm part.

The position setting means is operated in conjunction with the setting points to selectively tilt the camera upward or downward.

The signal output terminal unit has an RF converting terminal in addition to two AV terminals, with both the charger holder of the flat stand being connected to both a 6-voltage power source of the RF terminal and the camera in parallel and an RF convertor being selectively driven by electric power from the charger holder to convert an AV signal, output from the camera, into an RF signal thereby selectively providing an RF output in place of an AV output.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
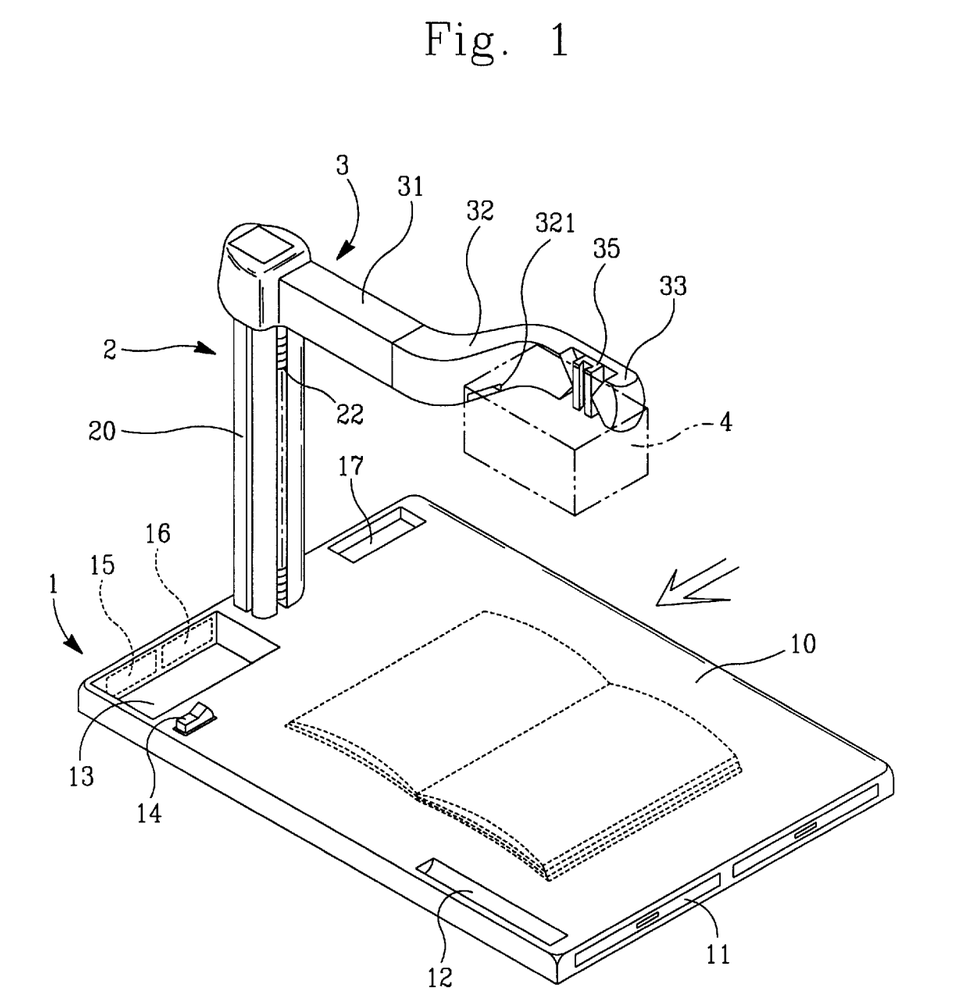
FIG. 1 is a perspective view showing the construction and configuration of an educational image display device according to the preferred embodiment of the present invention.

FIG. 1 is a perspective view showing the construction and configuration of an educational image display device according to the preferred embodiment of the present invention. As shown in the drawing, the educational image display device of this invention generally comprises a stand part 1, a support column part 2, a camera holding arm 3, a video camera 4 and a display means.

Figure 6:
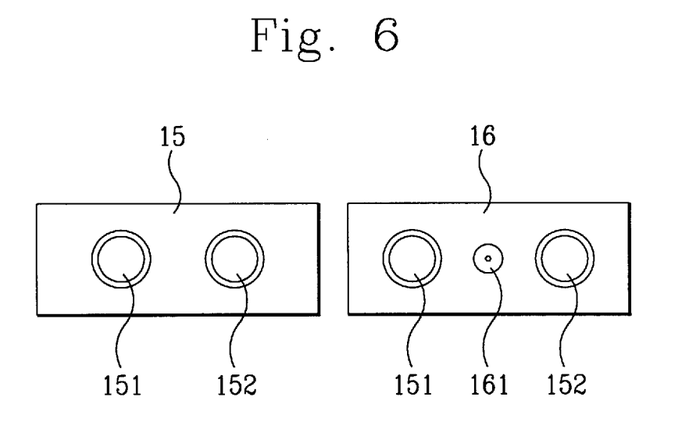
FIG. 6 is a view of signal input and output terminal units provided on a flat stand of the above device.

The stand part 1 comprises a flat stand 10, which is laid on a support surface and includes a drawer 11 defining a space for receiving and keeping various necessaries therein. A plurality of holders 12, 17 and 13 are formed on the stand 10 and are used for holding a pen, a remote controller and a charger respectively. The stand 10 also includes a column mounting slot (not shown) and an arm control switch (up-down switch) 14. The stand 10 further includes a signal input terminal unit 15 and a signal output terminal unit 16. The signal input terminal unit 15, which has two AV terminals 151 and 152, receives an image signal from a video camera, while the signal output terminal unit 16 outputs the input image signal to the display means such as a TV. The signal output terminal unit 16 has two AV terminals 151 and 152 and a 6-voltage power source. The above output terminal unit 16 is also used as an RF convertor insert unit as will be described later herein. The configuration of the two terminal units 15 and 16 are best shown in FIG. 6.

Figure 7:
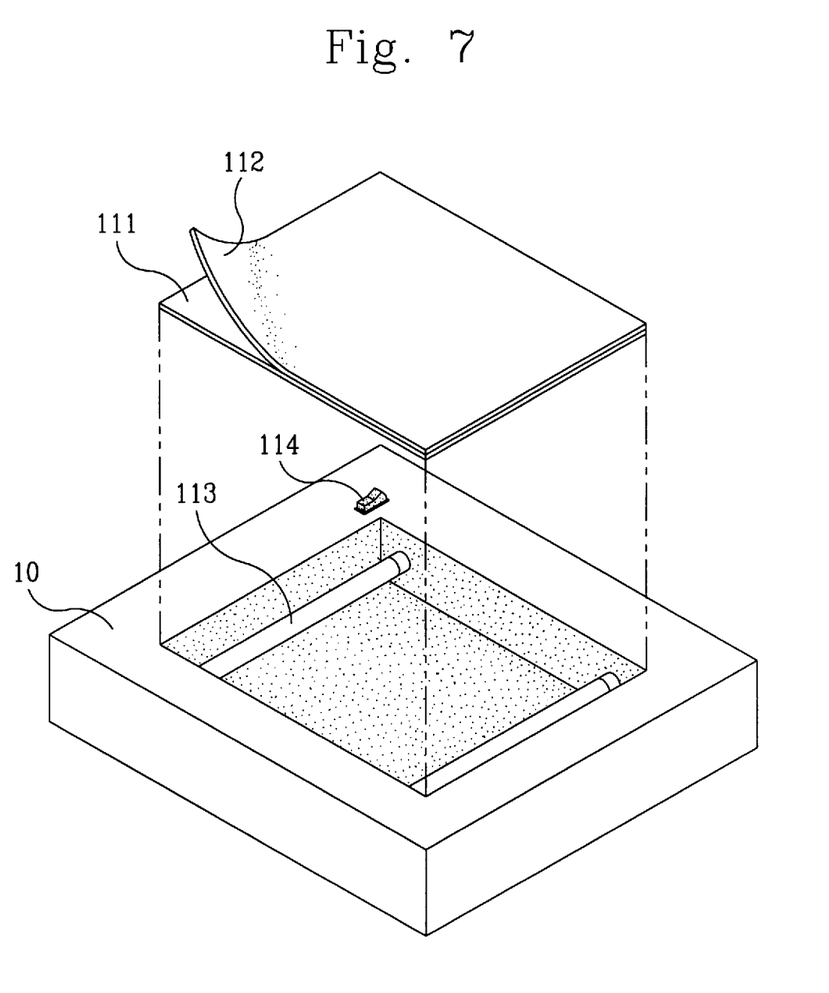
FIG. 7 is an exploded perspective view of the flat stand having a transparent glass panel, which is coated with a translucent white coating paper and is used as either a whiteboard or an OHP-filmed image revealing panel, according to the invention.

The display device of this invention can be preferably used in lecturing with OHP-TP documents, CT films and/or X-ray films or lecturing while writing letters and/or drawing figures to expound further upon a lecturing point. In order to achieve the above object, a bulb switch 114 is installed on a top corner of the flat stand 10, while two light bulbs 113, which are turned on or off in conjunction with the above switch 114, are installed in a rectangular depression formed on the top of the stand 10 as shown in FIG. 7. A transparent glass panel 111 coated with a translucent white coating paper 112 is set on the top of the above depression, thus forming a light box on the stand 10. The glass panel 111 coated with the translucent white coating paper 112 may be used as either a filmed image revealing panel, which transmits light from the light boxes 113 and reveals the filmed image of an OHP film laid on the top surface of the paper 112, or a whiteboard on which an instructor writes letters and/or draws figures with a board marker to expound further upon a lecturing point.

Figure 5:
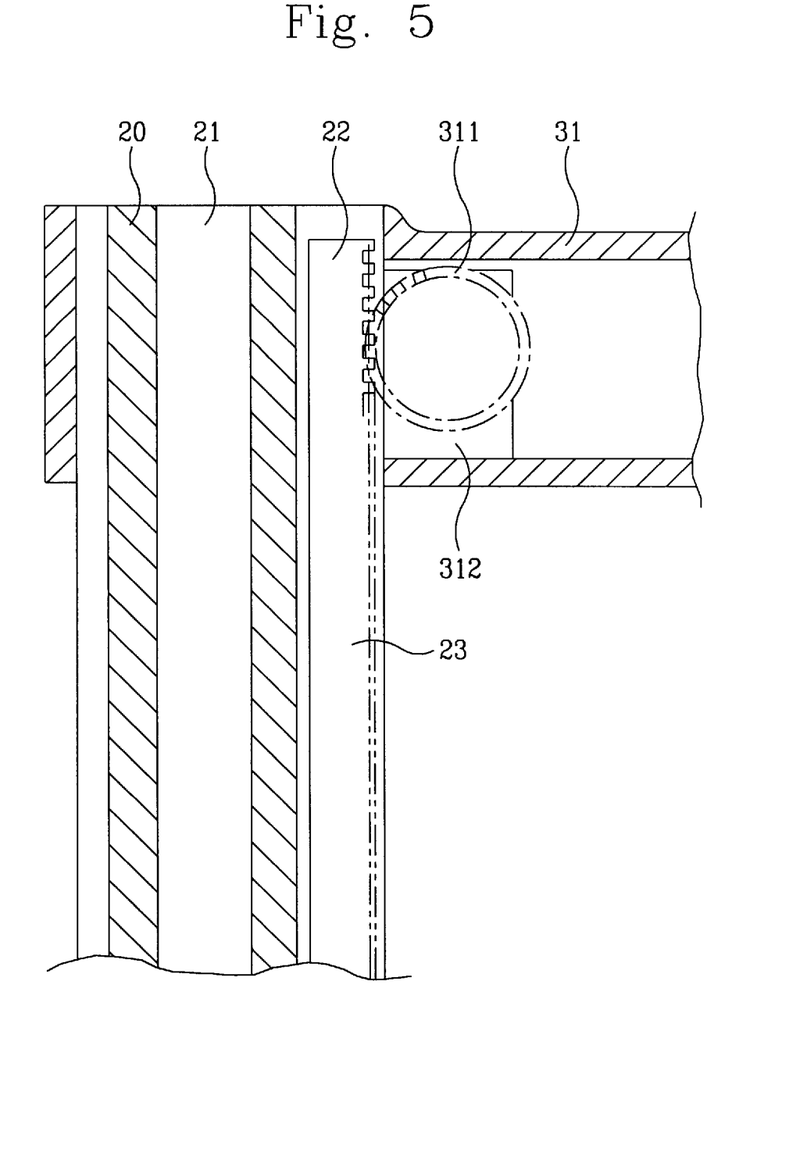
FIG. 5 is a sectional view showing a movable engagement structure, provided in the junction between an upright column and the camera holding arm and used for adjusting the position of the arm relative to the column.

Meanwhile, the support column part 2 comprises an upright column 20 which is fitted in the column mounting slot of the stand 10, thereby erecting the column on the stand 10. The column 20 is hollow thus defining an electric wire passage 21 therein and has a rack gear 22 on one sidewall thereof. The wire passage 21 passes an electric wire extending from the charger holder (power source) 13, which is used as a power source of the image display device of this invention. The rack gear 22 of the column 20 gears into a pinion gear 311 of a straight arm part 31 of the camera holding arm 3 in the junction between the column 20 and the arm 3. The arm 3 may be selectively raised or lowered relative to the column 20 when the arm control switch 14 of the stand 10 is operated. The movable interconnection between the column 20 and the arm 3 is best shown in FIG. 5.

The camera holding arm 3 generally comprises three parts: the hollow straight arm part 31, a hollow bent arm part 32 and a camera mount part 33.

The straight arm part 31 is movably and perpendicularly coupled to the column 20, with the pinion gear 311 gearing into the rack gear 22 of the column 20, thus being selectively raised or lowered relative to the column 20. The arm part 31 has a reduction motor 312 which is applied with electric power thus selectively raising or lowering the arm 3 relative to the column 20 when the arm control switch 14 of the stand 10 is operated.

Figure 4:
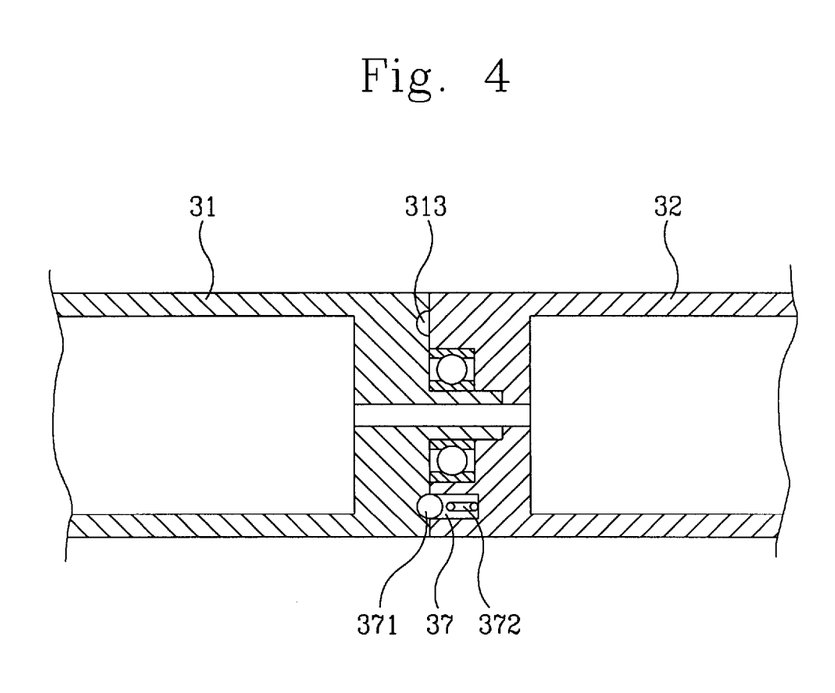
FIG. 4 is a sectional view showing the construction of a camera tilting angle adjusting part provided in the above camera holding arm.

The bent arm part 32 is rotatably coupled to the straight arm part 31 and is hollow thus defining an electric wire passage 321 therein. The wire passage 321 contains the electric wire, which extends from the power source 13 and passes through the passage 21 of the column 20. The straight arm part 31 of the camera holding arm 3 is provided with a plurality of setting points 313 in the junction between the arm parts 31 and 32, while the bent arm part 32 is provided with a position setting means 37. The position setting means 37 cooperates with the setting points 313 thus making the camera 4 selectively tiltable upward or downward at an angle of 135°. The position setting means 37 comprises a spring-biased ball 371, which is snapped into either of the setting points 313 of the straight arm part 31 thus setting an adjusted position of the camera 4. The ball 371 is biased by a compression coil spring 372. The rotatable interconnection between the two arm parts 31 and 32 is best shown in FIG. 4.

Figure 2:
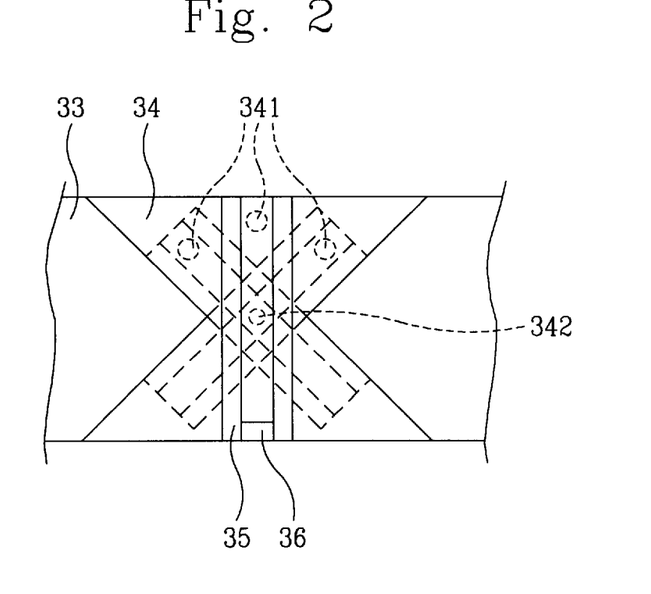
FIG. 2 is a front view of a camera mount part provided in a camera holding arm of the device according to this invention, showing the operation of a rotatable camera mount of the above part.
Figure 3:
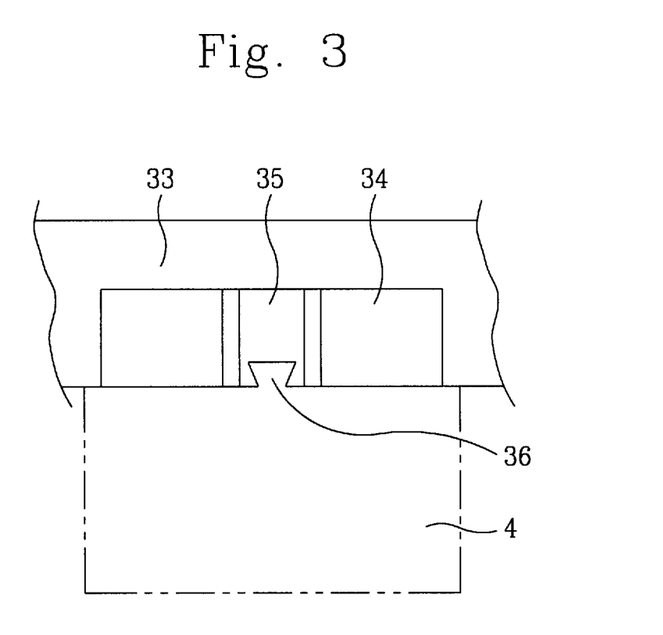
FIG. 3 is a plan view of the above camera mount part.

The camera mount part 33, which mounts the video camera 4 to the camera holding arm 3, is provided on the bent arm part 32. The camera mount part 33 includes a recessed mount seat 34 which is formed on the bent arm part 32 by cutting one sidewall of the bent arm part 32 into an X-shaped configuration. The mount seat 34 has a plurality of setting points 341. A longitudinal camera mount 35 is rotatably attached to the center of the mount seat 34 and holds the camera 4, with the camera 4 being selectively tilted to the left or right at an angle of 90°. In this case, it is preferable to screw the camera mount 35 to the center of the mount seat 34 using a bolt 342 thus rotatably attaching the mount 35 to the seat 34. The camera mount 35 has a spring-biased ball (not shown) which is snapped into either of the setting points 341 of the mount seat 34 thus setting an adjusted position of the camera 4. A dovetail slide groove 36 is longitudinally formed on the camera mount 35 and slidably and detachably attaches the video camera 4 to the camera mount 35 through a dovetail joint. The camera mount part 33 is best shown in FIGS. 2 and 3.

The display means such as a TV receives the image signal from the signal output terminal 16 of the stand 10 and thereby displays an educational image thereon.

The operational effect of the above image display device will be described hereinbelow.

In order to use the device for educational applications, a video camera 4 is slidably and detachably attached to the dovetail slide groove 36 of the camera mount 35 prior to connecting an AV wire to the camera 4. An original document laid on the stand 10 is picked up by the camera 4 so that an educational image picked up by the camera 4 is displayed on the display means.

In the prior art image display device, the original document has to be moved to a desired position when it is required to pick up the upper, lower, left or right side of the document by the camera so that the prior art device is inconvenient to a user. However, the above problem can be almost completely overcome by the device of this invention. That is, when it is required to tilt the camera to the left or right in order to pick up the left or right side of the document, the camera mount 35 is rotated to the left or right at an angle of 45° until the spring-biased ball of the mount 35 is snapped into the left or right setting point 341 of the mount seat 34. On the other hand, when it is required to tilt the camera upward or downward in order to pick up the upper or lower side of the document, the bent arm part 32 is rotated relative to the straight arm part 31 in a desired direction until the spring-biased ball 371 of the bent arm part 32 is snapped into a setting point 313 of the straight arm part 31.

In order to raise or lower the camera 4 and thereby to adjust the size of the picked-up area, the up-down switch 14 of the stand 10 is operated thus applying electric power of the power source 13 to the reduction motor 312 of the straight arm part 31. The motor 312 thus causes the pinion gear 311 of the arm part 31 to move upward or downward on the rack gear 22 of the column 20 so that the arm 3 along with the camera 4 is raised or lowered.

In the image display means of this invention, the signal output terminal unit 16 also has an RF converting terminal 161 in addition to the two AV terminals 151 and 152 so that an outmoded TV can be preferably used as the display means of the device.

That is, the signal input terminal unit 15, which receives AV signals from the camera 4, has two AV terminals 151 and 152. Meanwhile, the signal output terminal unit (RF convertor insert unit) 16, which outputs the signals from the input terminal unit 15 to the display means, has the RF converting terminal 161 in addition to the two AV terminals 151 and 152. In order to provide an RF output in place of an AV output and use an outmoded TV as the display means, an RF convertor (not shown) is connected to an AV terminal which is provided on the back wall of the stand 10. Electric power for the 6-voltage power source of the RF terminal 161 is applied from the power source 13 so that the power source 13 is connected to the camera 4 and the RF terminal 161 in parallel. That is, the power source 13 applies electric power to both the camera 4 and the RF terminal 161 of the signal output terminal unit 16.

In the prior art image display device, the location of an instructor, giving a lecture with the image display device, is limited to a side of the column 20 so that the instructor is disturbed by the column 20 while lecturing with a document being laid on the stand 10. However, in the image display device of this invention, the instructor gives a lecture while seeing the document in the direction as shown in the arrow of FIG. 1 so that the lecturer is free from being disturbed by the column 20 while lecturing with the document being laid straight on the stand 10.

In order to expound further upon a lecturing point, the instructor writes letters and/or draws figures, with a board marker, on the whiteboard, which comprises the glass panel 111 coated with the translucent white coating paper 112. In this case, the light bulbs 113 under the glass panel 111 are turned off so that the letters and/or figures on the panel 111 are clearly shown in the same manner as a conventional whiteboard. The letters and/or figures on the whiteboard are picked up by the camera 4 and in turn are displayed on the display means.

In order to lecture with both the display device and OHP films, the switch 114 of the flat stand 10 is operated to turn on the two light bulbs 113 inside the cavity of the light box, with an OHP film being laid on the glass panel 111. Light from the light bulbs 113 passes through the panel 111 coated with the paper 112, thus revealing the filmed image of the OHP film and allowing the camera 4 to effectively pick up the filmed image. The filmed image picked up by the camera 4 in turn is displayed on the display means.

The image display device of this invention may be preferably used for recording or video-microscopically picking up an image for various applications. The device of this invention also displays an image displayed on the screen of a notebook computer so that the device can be preferably used for multimedia or computer educational applications.

As described above, the present invention provides an image display device preferably used for educational applications. In the image display device of this invention, an instructor gives a lecture while seeing an original document without being disturbed by any element of the device. In addition, the video camera, which is detachably attached to the camera mount, may be tilted to the left or right or tilted upward or downward so that it is not required to move the original document when the left, right, upper or lower side of the document has to be picked up by the camera. Another advantage of the device resides in that the device has a means used as a whiteboard or a filmed image revealing panel so that the device is more preferably used in lecturing with OHP films or lecturing while writing letters and/or drawing figures to expound further upon a lecturing point. The device thus improves educational effect when it is used for educational applications. A further advantage of the device resides in that it is not expensive thus being widely used for educational applications without forcing excessive costs on the owner.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An educational image display device comprising:
 a flat stand laid on a support surface, said stand including:
  a drawer defining a space for receiving and keeping various necessaries therein;
  a plurality of holders used for holding a pen, a remote controller and a charger therein;
  a column mounting slot;
  an arm control switch;
  a signal input terminal unit receiving an image signal from a video camera; and
  a signal output terminal unit outputting the image signal to a display means;
 an upright column fitted in said column mounting slot of the stand, thereby erecting the column on the stand, said column being hollow, thus defining an electric wire passage therein and having a rack gear on one sidewall thereof;
 a camera holding arm perpendicularly coupled to said upright column with a pinion gear engaging with the rack gear of the column thus being selectively raised or lowered relative to the column when the arm control switch is operated, said camera holding arm including;
  a hollow straight arm part movably coupled to the column and having a reduction motor;
  a hollow bent arm part coupled to said straight arm part; and
  a camera mount part mounting the video camera to the camera holding arm; and
 the display means receiving the image signal from the signal output terminal unit of the stand and thereby displaying an image thereon.

2. The educational image display device according to claim 1, further comprising:
 a bulb switch installed on said flat stand;
 a light bulb installed in a light box formed on the top of said flat stand and turned on or off in conjunction with said bulb switch;
 a transparent glass panel set on the top of said light box; and
 a translucent white coating paper coated on the top of said glass panel, thus allowing the glass panel to be selectively used as an OHP-filmed image revealing panel or a whiteboard.

3. The educational image display device according to claim 1, wherein said camera mount part comprises:
 a recessed mount seat formed on said bent arm part by cutting one sidewall of the bent arm part into an X-shaped configuration, said seat having a plurality of setting points;
 a longitudinal camera mount rotatably attached to the center of said mount seat and adapted for holding the camera, said mount having a spring-biased ball snapped into either of the setting points of the mount seat thus setting an adjusted position of the camera; and
 a dovetail slide groove longitudinally formed on said camera mount and slidably and detachably attaching the video camera to the camera mount through a dovetail joint.

4. The educational image display device according to claim 3, wherein said camera mount selectively tilts the camera to the left or right.

5. The educational image display device according to claim 1, wherein said bent arm part of the camera holding arm is coupled to said straight arm part, with position setting means and a plurality of setting points being provided on opposite surfaces of said bent and straight arm parts respectively in the junction between the two arm parts, said position setting means having a spring-biased ball seated into either of the setting points of the straight arm part.

6. The educational image display device according to claim 5, wherein the position setting means is operated in conjunction with the setting points to selectively tilt the camera upward or downward.

7. The educational image display device according to claim 1, wherein the signal output terminal unit has an RF (radio frequency) converting terminal in addition to two AV (audio/video) terminals, with both said charger holder of the flat stand being connected to both a 6-voltage power source of said RF terminal and the camera in parallel and an RF convertor being selectively driven by electric power from the charger holder to convert an AV signal, output from the camera, into an RF signal thereby selectively providing an RF output in place of an AV output.

* * * * *